United States Patent [19]

Oliveira Da Cunha Lima

[11] Patent Number: 5,359,007
[45] Date of Patent: Oct. 25, 1994

[54] THERMOPLASTIC RUBBER OBTENTION METHOD

[75] Inventor: Luiz C. Oliveira Da Cunha Lima, Rio de Janeiro, Brazil

[73] Assignee: Relastomer S/A, Rio de Janeiro, Brazil

[21] Appl. No.: 842,408

[22] PCT Filed: Jul. 24, 1991

[86] PCT No.: PCT/BR91/00015

§ 371 Date: May 26, 1992

§ 102(e) Date: May 26, 1992

[87] PCT Pub. No.: WO92/01745

PCT Pub. Date: Feb. 6, 1992

[30] Foreign Application Priority Data

Jul. 26, 1990 [BR] Brazil .................................. 9003627

[51] Int. Cl.$^5$ .................. C08K 3/08; C08L 23/04; C08L 27/06; C08L 9/00
[52] U.S. Cl. ................................... 525/232; 525/239; 525/240; 524/413
[58] Field of Search ....................... 525/232, 240, 239; 524/413

[56] References Cited

U.S. PATENT DOCUMENTS

| | | | |
|---|---|---|---|
| 4,257,925 | 3/1981 | Freegard | 525/315 |
| 4,400,488 | 8/1983 | Lal et al. | 525/192 |
| 5,010,122 | 4/1991 | Koski | 525/101 |

*Primary Examiner*—James J. Seidleck
*Assistant Examiner*—W. R. H. Clark
*Attorney, Agent, or Firm*—Cushman, Darby & Cushman

[57] ABSTRACT

A method is disclosed for obtaining a thermoplastic rubber, from raw materials wich comprehend used rubber artifacts, like tires and other rubber products, devulcanized by means of physical, chemical, or physicochemical process, transformed into an uniform and regular batch, wich is blended to a thermoplastic, thus obtaining a thermoplastic rubber for diversified industrial applications.

5 Claims, No Drawings

THERMOPLASTIC RUBBER OBTENTION METHOD

The present invention is related to a new method for obtaining a thermoplastic rubber, using as main products the devulcanized rubber or rubbers of little vulcanizing, along with a thermoplastic.

The thermoplastic rubber is already known, since the last century, under the names of gutta-percha, balata ou chicle. It is a form of TRANS 1-4 polyisoprene, obtained from the latex of one sapotacea, differing of the natural rubber, wich is the form of CIS 1-4 polyisoprene. The gutta-percha is a hard, low elongation, low water permeability and high dieletric resistance product. It has been used for many years in the coating of electric cables, namely submarine cables, golf balls, heat-sealing adhesives, chewing gums, varnishes, etc, along with a various applications in dental treatment.

With the devellopment of the synthetic polymers, appeared the TRANS-polyisoprene and the TRANS-polybutadiene with characteristics approaching those of the natural polymers.

They can be vulcanized, resulting in a product more or less crystalline wich keeps the deformation at ambient temperature, being recoverable by heating. They are reinforced with carbon black, acquiring exelent abrasion resistance, thus being applied in heels, soles, pavements, gaskets, sponges, golf balls, battery cases, etc. New kinds of polymers were also devellopped, now no more in the TRANS 1-4 form, like the by-products of the POLYURETHANES, POLYESTERS, STIRENICS and OLEFININCS. The most used are the STIRENIC thermoplastic rubbers, followed by the OLEFINICS and POLYESTERS. The polyurethanes, due to their high cost, are used only in very rare and specific cases.

The main use of thermoplastic rubbers is in the manufacture of heels and soles, gaining back a large slice of the market that has been absorbed by the polyvinyl chloride (PVC). As is of general knowledge, the processing of plastic is much more economic than the processing of the conventional rubber, since it is not necessary to vulcanize the plastic and the process burrs may be used anew, with the same characteristics of the original product. The rubber in its natural state is composed of different products, wich are blended, homogenized, allowed to rest for 24 hours, pre-molded, vulcanized and, finally, burred. The burrs and vulcanization leftovers are not ready re-usable, and they have to be reclaimed. The vulcanization transforms the rubber blend from a plastic state into an elastic state, and it does not return to the plastic state, as is the case of plastics, by means of mere heating. Only in rare cases, when the thermoplastic is cured, its burrs cannot be re-used by mere heating. It is necessary to uncure them, a process akin to devulcanization.

Thus, the main application of the thermoplastic rubber, after blending, is to be processed, without the need to vulcanize it, and left-overs and the burrs may return to the initial process.

Although there are many kinds of thermoplastic rubbers with applications in industry, the price factor keeps some restrictions to their use, chiefly because of the difficulties that thermoplastics show on being blended with pigments that would mantain or enhance their characteristics.

The inventor develloped a simple method for the manufacturing of thermoplastic rubber wich fulfills not only the product quality requirement, but also the economic one, that is, producing it from a plentyful and problematic raw material, wich is the already vulcanized rubber artifact, like tires, leftovers or surplus of pre-vulcanized moldings, transtorming it, blended with thermoplastics, in a kind of thermoplastic rubber with characteristics adequated for being used in a rubber artifact.

The already vulcanized rubber artifact undergoes a devulcanization process, physical, chemical or physicochemical, being transformed into a regular and uniform batch, known as Regenerated Rubber, Reclaimed Rubber. Devulcanized Rubber or Devulcanized Rubber "Masterbatch". This devulcanized rubber is heated to the plastic melting point and blended with it. The batch thus obtained is homogenized, its crosslinking degree is adjusted with vulcanizer agent, and thereafter cut into little pieces by a pelletization process. In this way it can be reprocessed as a normal thermoplastic.

The present method can be carried out in two different ways: 1) putting all products into the mill at the same time, or: 2) putting them separately. None of both forms alters substantially the end product, the choice depending only of the criteria and faccilities of the operator.

As seen before, the process is comprehended of a blending of devulcanized rubber with a thermoplastic, wich can be a polyparaffine or a polyvinyl chloride, or any other thermoplastic, adding or not other products, wich are selected as a function of the final application characteristics, as, for example, resins, vulcanizers, oils, accelerators, retarders, pigments, dyers, dispersants, etc.

Different compositions were prepeared: EXAMPLE No. 1: About 200 g of polypropylene were put into an open blender, heated to about 180° C. The temperature was adjusted in a way that the polypropylene was totaly molten and adhering to the roll. About 200 g of devulcanized tire rubber, previously heated and laminated with dispersant product, were added little by little. After all rubber was added to the batch, it was homogenized, cut into strips and pelletized.

The product, after resting for 24 hours, was injected into a test mold and its characteristics were determined:

| DENSITY | 1.013 g/cm$^3$ |
| --- | --- |
| HARDNESS | 85 Shore A |
| TEAR STRENGHT | 110 kg/cm$^2$ |
| ELONGATION | 300% |
| WEAR | 400 cm$^3$ |
| FLEXION | >5,000 N |

EXAMPLE No. 2: Into a manganese steel ball mill were put 200 g of pure rubber, already vulcanized, 1,200 g of toluene and 200 g of high density polythylene. The batch was allowed to swell for 24 hours and thereafter the grinding started. After 48 hours it was removed from the mill and dryed. The product was put into a roll blender previously heaten to 180° C., melting point of the high density polyethylene, and integrally blended. Thereafter is was homogenized with dispersant agent and the crosslinking degree was adjusted with a curing agent.

The product, after resting for 24 hours was injected into a test mold and its characteristics were determined:

| DENSITY | 0.92 g/cm³ |
| --- | --- |
| HARDNESS | 60 Shore A |
| TEAR STRENGHT | 98 kg/cm² |
| ELONGATION | 400% |
| WEAR | 580 cm³ |
| FLEXION | >2,000 N |

EXAMPLE No. 3: In an open blender were added 200 g of pre-vulcanized rubber and 2 g of bezoic acid, and the batch was homogenized. The product was cut into little pieces and put into a manganese steel ball mill, along with 1,200 g of trichloroethylene and 200 g of PVC. The batch was allowed to swell for 12 hours and thereafter the grinding started. After 48 hours the batch was removed from the ball mill and dryed. The product was put into a cilinder blender, pre-heated to the melting point of PVC, homgenized with a dispersant agent, had its crosslinking degree adjusted and was cut into stripes. The product was thereafter pelletized and allowed to rest for 24 hours. Following this it was injected into a test mold and its characteristics were determined:

| DENSITY | 1.030 g/cm³ |
| --- | --- |
| HARDNESS | 61 Shore A |
| TEAR STRENGHT | 121.5 kg/cm² |
| ELONGATION | 432% |
| WEAR | 422 cm³ |
| FLEXION | >3,000 N |

I claim:

1. A method of producing a thermoplastic rubber comprising the following steps:
    forming a mixture of waste vulcanized rubber, solvent and a thermoplastic selected from the group consisting of polyolefins and vinylchloride polymers and copolymers;
    grinding said mixture in a mill in the presence of manganese which devulcanizes said vulcanized rubber to a reclaimed rubber; and
    heating and homogenizing said mixture to result in a smooth, homogeneous thermoplastic rubber.

2. The method according to claim 1, wherein in said grinding step, the presence of manganese devulcanizes said vulcanized rubber resulting in 5 to 95% by weight of devulcanized rubber, relative to the amount of thermoplastic rubber.

3. The method of claim 1 wherein in the homogenizing step, a curing agent is added to control the degree of crosslinking in said thermoplastic rubber.

4. The method of claim 1 wherein the homogenizing step further comprises adding a compound selected from the group consisting of resins, vulcanizers, oils, accelerators, retarders, pigments, dyes, dispersants, or a mixture thereof.

5. A method of producing a thermoplastic rubber comprising the following steps:
    forming a mixture of waste vulcanized rubber and solvent;
    grinding said mixture in a mill in the presence of manganese which devulcanizes said vulcanized rubber to a reclaimed rubber;
    adding a thermoplastic to said mixture said thermoplastic being selected from the group consisting of polyolefins and vinylchloride polymers and copolymers; and
    heating and homogenizing said mixture to result in a smooth, homogeneous thermoplastic rubber.

* * * * *